Patented Nov. 11, 1952

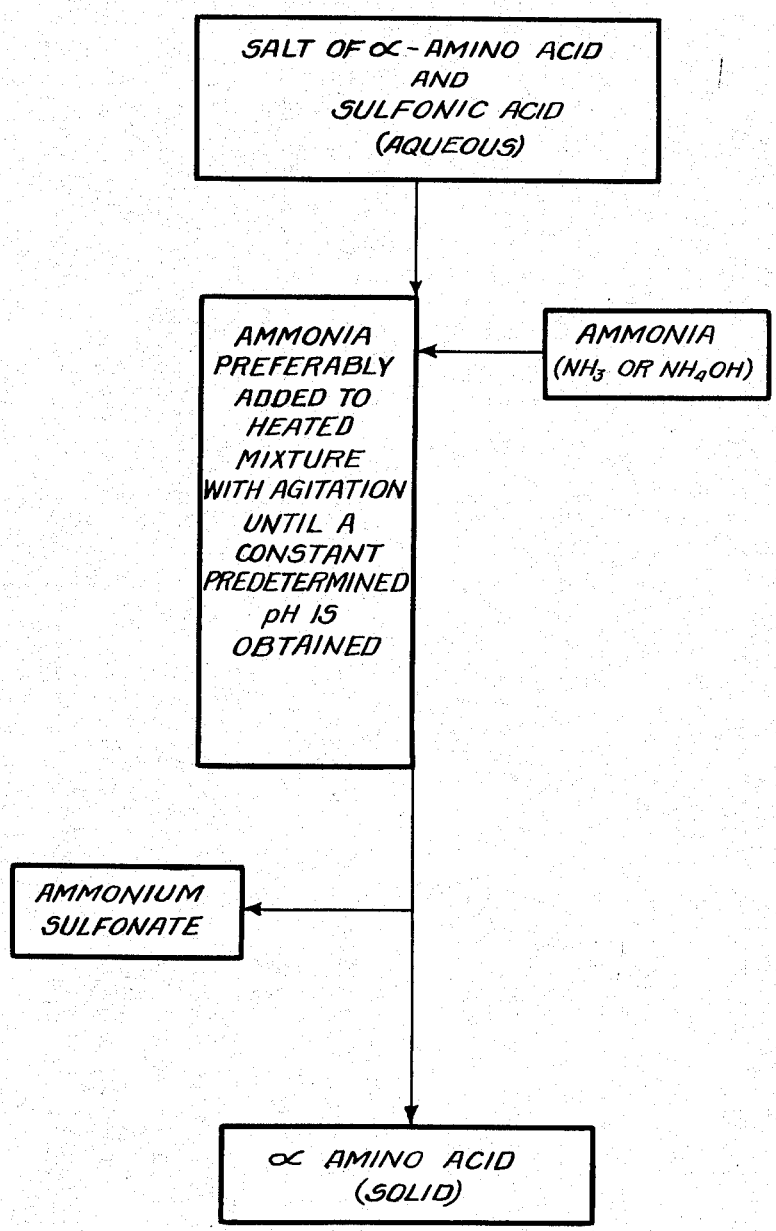

2,617,823

UNITED STATES PATENT OFFICE 2,617,823

ISOLATION OF AMINO ACIDS

Hans Wolff and Arthur Berger, Decatur, Ill., assignors to A. E. Staley Manufacturing Company, Decatur, Ill., a corporation of Delaware Application February 16, 1949, Serial No. 76,772

16 Claims. (Cl. 260—519)

This invention relates, generally, to a new and useful method of obtaining α-amino acids from sufonic acid salts thereof. More specifically, the invention relates to such a method wherein a sufficient amount of ammonia is added to an aqueous solution or slurry of a sulfonic acid salt of an α-amino acid so as to convert the salt into a precipitate of α-amino acid and a solution of the ammonium salt of the sulfonic acid.

The object of the present invention, generally stated, is the provision of a new and useful method whereby a substantially pure α-amino acid may be efficiently, conveniently and economically obtained or recovered from a sulfonic acid salt of the α-amino acid by introducing a sufficient quantity of ammonia into an aqueous solution or slurry of the salt.

An important object of the invention is the provision of an efficient, convenient and economical method of recovering in solid form the α-amino acid content of a sulfonic acid salt thereof by preparing an aqueous solution or slurry of the salt, heating the solution or slurry, and introducing ammonia into the solution with intimate mixing until the pH reaches the desired predetermined value, whereupon the α-amino acid precipitates. In general, this pH will be close to the isoelectric point of the amino acid, a condition of minimum solubility.

Another important object of the invention is the provision of an efficient, convenient and economical method of preparing large quantities of substantially pure α-amino acids wherein toxic chemicals are not employed, noxious odors are not produced, and the by-products may be readily processed to conserve and recover chemicals used in the process.

Certain other objects of the invention will in part be obvious, and will in part appear hereinafter.

For a more complete understanding of the nature and scope of the invention, reference may now be had to the following detailed description thereof wherein certain presently preferred embodiments of the invention are set forth in the specific examples given.

The accompanying drawing is a flow diagram of the invention showing the starting material, chemicals added, and the final product obtained.

The term "ammonia" as used in the specification and the appended claims designates generically any one of the several forms of this substance including gaseous ammonia (usually designated as NH3) and the aqueous solution of the gas (usually referred to as ammonium hydroxide and designated as NH4OH).

Substantially pure sulfonic acid salts of α-amino acids, the starting materials in the present invention, may be prepared in known manner from the corresponding crude α-amino acids. Such salts are frequently only slightly soluble in water, and for that reason they may be handled in the form of aqueous slurries in practicing this invention.

It was found that when the required amount of ammonia is added to a cold aqueous solution or slurry of a sulfonic acid salt of an α-amino acid, the desired pH was reached rather slowly. Under these conditions, the pH tends to drift back to lower values, due to the lag in reaching equilibrium, so that repeated additions of ammonia are necessary to obtain a constant pH. However, it was further found that particularly good results could be obtained when the aqueous solution or slurry was heated, even up to the boiling point, since the reaction then takes place in a matter of minutes and the desired pH value is reached more readily. At superatmospheric pressures, temperatures higher than those corresponding to normal boiling points may be used.

It is known that α-amino acids have a minimum solubility in water at their isoelectric points. Accordingly, the pH values in the process are selected as producing optimum conditions for complete precipitation of the α-amino acid formed.

The invention is generally useful in recovering the α-amino acid content of sulfonic acid salts of α-amino acids as a class. According to the general method of invention, the particular salt of this class undergoing treatment is put into the form of an aqueous solution or slurry. Frequently, a slurry is prepared in view of the low solubility of the salts of this class so as to minimize the volumes of material being handled. The slurry or solution of the salt is heated, even up to boiling, in suitable equipment and then the ammonia is introduced with agitation until a substantially constant, predetermined pH value is obtained. In standardized operations, predetermined amounts of ammonia are added in carrying out the process. Otherwise, the pH may be determined by use of a suitable indicator or by use of one of the measuring instruments commercially available for this purpose. The α-amino acid formed separates as a precipitate and may be recovered from the ammonia sulfonate solution by known techniques, such as filtration or by centrifuging. In this connection it may be noted that the solubilities of the ammonium salts of the sulfonic acids are such that these salts will be completely soluble in the volumes of water normally used.

EXAMPLE NO. 1

*Decomposition of l-leucine-β-naphthalenesulfonate with aqueous ammonia*

(a) At boiling temperatures: The β-naphthalenesulfonate of l-leucine (l-leucine nasylate) was prepared according to known method. A mixture of 377 g. of l-leucine nasylate and 1508 ml. of water was heated to boiling under reflux conditions. While the mixture was stirred with a mechanical stirrer, a solution of 68 g. of 28% aqueous ammonium hydroxide was added slowly beneath the surface; this amount was required in order to obtain a pH of 6.0 within three to five minutes after the ammonia had been added. This pH value remained substantially constant on boiling the mixture for several more minutes. After allowing to cool to room temperature the leucine was separated from the ammonium naphthalenesulfonate by filtration or centrifuging. The leucine was then washed with water until free from mother liquors. There was obtained 100 g. of pure leucine. N found 10.6 to 10.8% (calcd. 10.7%).

(b) At room temperatures: Adding aqueous ammonium hydroxide to leucine nasylate at room temperature with stirring gave similar results, but it took over two hours before a constant pH reading was obtained.

EXAMPLE NO. 2

*Decomposition of l-leucine-β-naphthalenesulfonate with ammonia gas*

Through a mixture of 377 g. of l-leucine nasylate and 1508 ml. of water under reflux a slow stream of ammonia gas was bubbled. A few drops of methyl red indicator were added to the mixture. The turning from red to yellow indicates the approximate end point. By adjusting the pH to 6.0–6.3, 100 g. of l-leucine was isolated on filtration of the reaction mixture.

EXAMPLE NO. 3

*Ammonia decomposition of dl-methionine-p-toluenesulfonate*

The p-toluenesulfonate of dl-methionine was prepared and identified (N calcd. 4.3%, found 4.2%) M. P. 170–1°. To a solution of 10.5 g. of this sulfonate in 25 ml. of boiling water, ammonia was added until a constant pH of 6.5 was obtained. The dl-methionine was isolated by filtration and analyzed. N calcd. 9.4%, found 9.2%.

EXAMPLE NO. 4

*Ammonia decomposition of dl-methionine o-tosyl-p-phenolsulfonate*

This sulfonate was obtained from 28 g. of dl-methionine dissolved in 38 ml. of 5 N hydrochloric acid and 400 ml. of a 0.54 N solution of o-tosyl-p-phenolsulfonic acid. The sulfonate (20 g.) M. P. 178–9° C., N calcd. 3.1%, found 2.9%, was dissolved in boiling water (150 ml.) and after addition of 5 ml. of a 28% aqueous ammonia solution, the pH of 6.7 was obtained. On cooling, 5.3 g. of pure dl-methionine was obtained. (Analyzed for 100% methionine according to the colorimetric method of Hess and Sullivan, J. Biol. Chem., 151, 635 (1943).)

EXAMPLE NO. 5

*Ammonia decomposition of l-tyrosine-2′, 4′-dinitrodiphenylether-p-sulfonate*

To 32 g. of the sulfonate (melting with decomposition at 196–8°) in 80 cc. of boiling water, ammonia was added until neutral. Pure tyrosine, about 7 g., was obtained (N calcd. 7.7%, found 7.7%).

EXAMPLE NO. 6

*Ammonia decomposition of l-leucine-p-toluenesulfonate*

To 14 g. of l-leucine-p-toluenesulfonate (M. 166–7, N calcd. 4.6%, found 4.6%) in 60 ml. of boiling water ammonia was added until the pH of 6.8 was reached. On filtration 3.5 g. of l-leucine was obtained (amino N, Van Slyke calcd. for 10.7%, found 10.6%).

EXAMPLE NO. 7

*Ammonia decomposition of dl-methionine-2′, 4′-dinitrodiphenylether-p-sulfonate*

To the sulfonate (M. 191–3°) in aqueous solution ammonia was added to a pH of 6.8. The dl-methionine was separated by centrifuging, washed and dried. N calcd. 9.4%, found 9.2%.

EXAMPLE NO. 8

*Ammonia decomposition of l-cystine-p-toluenesulfonate*

To 12 g. of l-cystine 19 g. of p-toluenesulfonic acid monohydrate was added, and the hot solution was filtered from impurities. On concentration of the filtrate a heavy syrup was obtained which was treated while hot with aqueous ammonia to a constant pH of 6.9. There is obtained 10 g. of l-cystine.

It will be understood that in carrying out the present invention, there is a considerable range of latitude with respect to such conditions as concentration, temperature, and time. However, it is very desirable to add the ammonia to the solutions or slurries of the α-amino acid salts of the sulfonic acid, heated to elevated temperatures, preferably to boiling.

In view of the foregoing disclosure, those skilled in the art will be able to practice the invention either according to the specific embodiments set forth above, or according to other embodiments which will be obvious. Accordingly, all matter set forth above is intended to be interpreted as illustrative and not in a limiting sense.

What is claimed as new is:

1. The method of obtaining a sparingly soluble alpha-amino acid, selected from the group consisting of l-cystine, l-tyrosine, l-leucine and dl-methionine, from a sparingly soluble, aromatic sulfonic acid salt thereof in aqueous mixture, wherein the sulfonic acid forms a soluble ammonium sulfonate, comprising: adding ammonia to said mixture in an amount sufficient to react with substantially all of said salt so as to produce a precipitate of the sparingly soluble alpha-amino acid and a solution containing the soluble ammonium sulfonate, and separating the precipitate; said l-cystine salt being p-toluenesulfonate, said l-tyrosine salt being 2',4'-dinitrodiphenylether-p-sulfonate, said l-leucine salt being selected from the group consisting of beta-naphthalenesulfonate and p-toluenesulfonate, and said dl-methionine salt being selected from the group consisting of p-toluene-sulfonate, o-tosyl-p-phenolsulfonate and 2',4'-dinitrodiphenylether-p-sulfonate.

2. The method of claim 1, wherein the ammonia is added in an amount sufficient to raise the pH of the aqueous mixture to a value approximately equal to the iso-electric point of the amino acid, this being a point of minimum solubility of the amino acid.

3. The method of claim 1, wherein the ammonia is added while the mixture is at a substantially elevated temperature.

4. The method of claim 1, wherein the ammonia is added while the mixture is at a substantially elevated temperature and in an amount sufficient to raise the pH of the aqueous mixture to a value approximately equal to the iso-electric point of the amino acid, this being a point of minimum solubility of the amino acid.

5. The method of obtaining l-cystine from the p-toluenesulfonic acid salt thereof, comprising: adding ammonia to said salt in aqueous medium in an amount sufficient to react with substantially all of said salt so as to produce a precipitate of l-cystine and a solution of ammonium p-toluenesulfonate, and separating the precipitate.

6. The method of obtaining l-tyrosine from the 2',4'-dinitrodiphenylether-p-sulfonic acid salt thereof, comprising: adding ammonia to said salt in aqueous medium in an amount sufficient to react with substantially all of said salt so as to produce a precipitate of l-tyrosine and a solution of 2',4'-dinitrodiphenylether-p-sulfonate, and separating the precipitate.

7. The method of obtaining l-leucine from the salt thereof with a sulfonic acid selected from the group consisting of beta-naphthalenesulfonic and p-toluenesulfonic acids, comprising: adding ammonia to said salt in aqueous medium in an amount sufficient to react with substantially all of said salt so as to produce a precipitate of l-leucine and a solution of ammonium sulfonate, and separating the precipitate.

8. The method of obtaining dl-methionine from the salt thereof with a sulfonic acid selected from the group consisting of p-toluenesulfonic, o-tosyl-p-phenolsulfonic and 2',4'-dinitrodiphenylether-p-sulfonic acids, comprising: adding ammonia to said salt in aqueous medium in an amount sufficient to react with substantially all of said salt so as to produce a precipitate of dl-methionine and a solution of ammonium sulfonate, and separating the precipitate.

9. The method of obtaining l-leucine from l-leucine-β-naphthalenesulfonate, which comprises, adding ammonia to said l-leucine-β-naphthalenesulfonate in aqueous medium in an amount sufficient to produce a pH within the range of 6–7 and to react with substantially all of said l-leucine-β-naphthalenesulfonate so as to produce a precipitate of l-leucine and a solution of ammonium β-naphthalenesulfonate.

10. The method of obtaining dl-methionine from dl-methionine-p-toluenesulfonate, which comprises, adding ammonia to said dl-methionine-p-toluenesulfonate in aqueous medium in an amount sufficient to produce a pH within the range of 6–7 and to react with substantially all of said dl-methionine-p-toluenesulfonate so as to produce a precipitate of dl-methionine and a solution of ammonium p-toluenesulfonate.

11. The method of obtaining l-tyrosine from l-tyrosine-2',4'-dinitrodiphenylether-p-sulfonate, which comprises, adding ammonia to said l-tyrosine-2',4'-dinitrodiphenylether-p-sulfonate in aqueous medium in an amount sufficient to produce a pH within the range of 6–7 and to react with substantially all of said l-tyrosine-2',4'-dinitrodiphenylether-p-sulfonate so as to produce a precipitate of l-tyrosine and a solution of ammonium 2',4'-dinitrodiphenylether-p-sulfonate.

12. The method of obtaining l-cystine from l-cystine-p-toluenesulfonate, which comprises, adding ammonia to said l-cystine-p-toluenesulfonate in aqueous medium in an amount sufficient to produce a pH within the range of 6–7 and to react with substantially all of said l-cystine-p-toluenesulfonate so as to produce a precipitate of l-cystine and a solution of ammonium p-toluenesulfonate.

13. The method of claim 9 wherein said aqueous medium is heated to boiling during said addition of ammonia.

14. The method of claim 10 wherein said aqueous medium is heated to boiling during said addition of ammonia.

15. The method of claim 11 wherein said aqueous medium is heated to boiling during said adtion of ammonia.

16. The method of claim 12 wherein said aqueous medium is heated to elevated temperature during said addition of ammonia.

HANS WOLFF.
ARTHUR BERGER.

REFERENCES CITED

The following references are of record in the file of this patent:

UNITED STATES PATENTS

| Number | Name | Date |
|---|---|---|
| 2,186,162 | Braun | Jan. 9, 1940 |
| 2,443,391 | Kirkpatrick | June 15, 1948 |

OTHER REFERENCES

Doherty et al.: J. Biol. Chem., vol. 135, pp. 487–496 (1940).

Moore et al.: J. Biol. Chem., vol. 143, pp. 121–129 (1942).